(12) United States Patent
Kitamura et al.

(10) Patent No.: US 6,191,894 B1
(45) Date of Patent: Feb. 20, 2001

(54) ZOOM LENS AND IMAGING DEVICE INCORPORATING THE SAME

(75) Inventors: Kazuya Kitamura, Tenri; Tetsuo Iwaki, Yamatokoriyama, both of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/393,821

(22) Filed: Sep. 10, 1999

(30) Foreign Application Priority Data

Sep. 10, 1998 (JP) .................................................. 10-257306

(51) Int. Cl.$^7$ .................................................. G02B 15/14
(52) U.S. Cl. ............................................ 359/676; 359/683
(58) Field of Search .................................. 359/676, 683, 359/684, 708

(56) References Cited

U.S. PATENT DOCUMENTS 5,818,646 * 10/1998 Hamano ............................... 359/684

FOREIGN PATENT DOCUMENTS

| 5297275 | 11/1993 | (JP) . |
| 9269452 | 10/1997 | (JP) . |
| 10-133113 | * 5/1998 | (JP) . |
| 10-268194 | * 10/1998 | (JP) . |
| 11-72705 | * 3/1999 | (JP) . |

* cited by examiner

*Primary Examiner*—Georgia Epps
*Assistant Examiner*—Jordan M. Schwartz

(57) ABSTRACT

A zoom lens including: a first lens array which has positive refractive power and which is in a fixed position relative to an image plane; a second lens array which has negative refractive power and which provides variable power by moving along an optical axis direction; a third lens array which has positive refractive power and which is in a fixed position relative to the image plane; a fourth lens array which has positive refractive power and which is capable of moving along the optical axis direction so as to maintain the image plane, which moves corresponding to movement of the second lens array and an object to be imaged, at a predetermined distance from a reference plane; a fifth lens array which has negative refractive power and which is in a fixed position relative to the image plane; and a sixth lens array which has positive refractive power and which is in a fixed position relative to the image plane. The first to sixth lens arrays are arranged in a first through sixth order, respectively, so that the first lens array lies adjacent to the object to be imaged.

13 Claims, 13 Drawing Sheets

FIG. 2
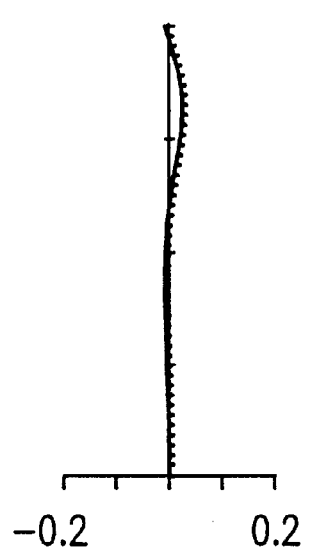
F/No.1.83
Spherical aberration (mm)
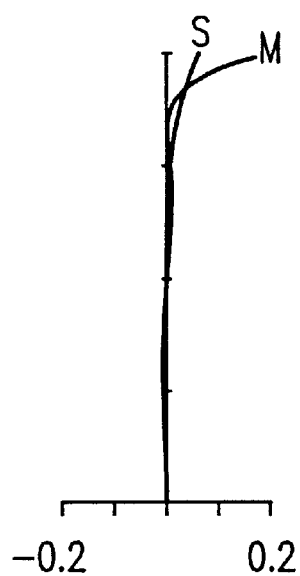
ω=27°
Astigmatism (mm)
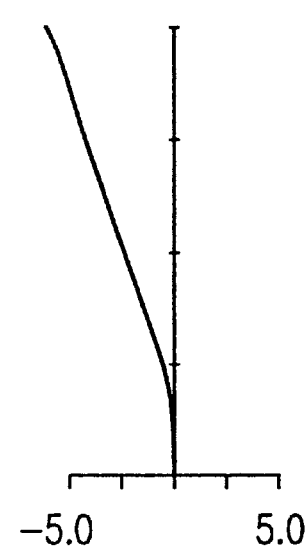
ω=27°
Distortion (%)
............ C line
———— d line
——–—— F line

FIG. 3
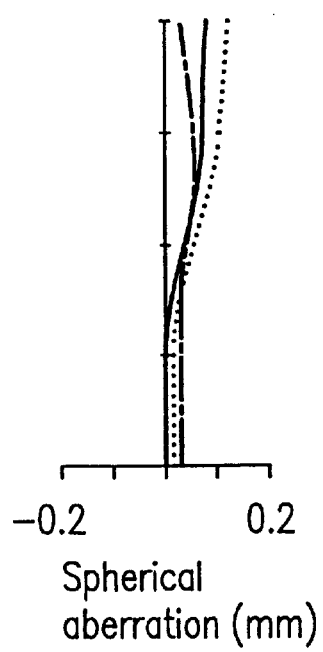
F/No.2.33
Spherical aberration (mm)
−0.2 to 0.2
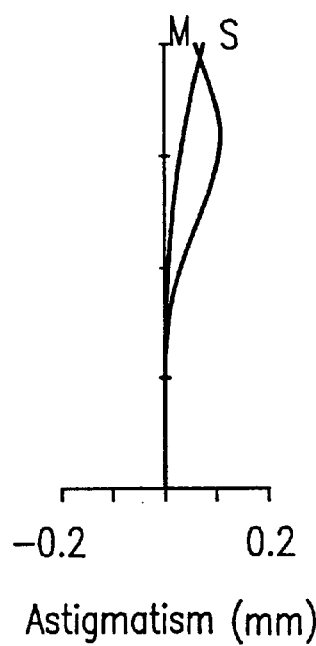
ω=5°
M S
Astigmatism (mm)
−0.2 to 0.2
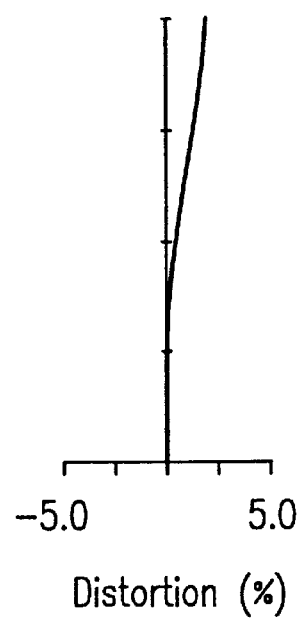
ω=5°
Distortion (%)
−5.0 to 5.0
............... C line
─────── d line
─ ─ ─ ─ F line

FIG. 6
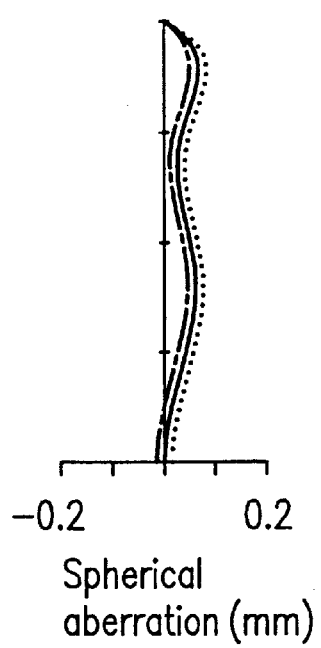
F/No.1.83
Spherical aberration (mm)
−0.2 to 0.2
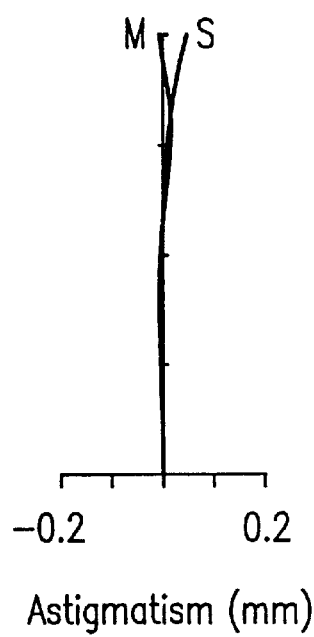
ω=27°
M  S
Astigmatism (mm)
−0.2 to 0.2
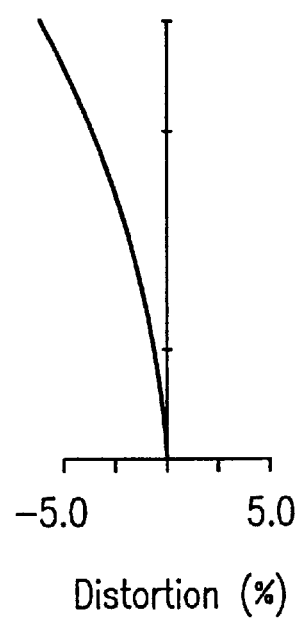
ω=27°
Distortion (%)
−5.0 to 5.0
·········· C line
———— d line
— — — F line

FIG. 7
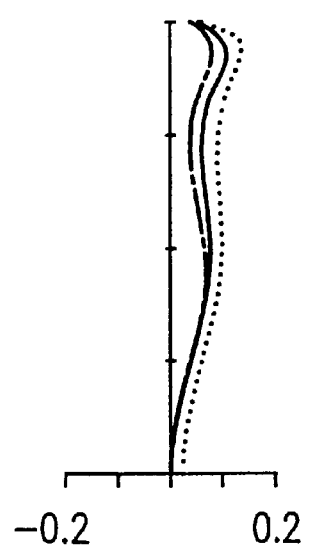
F/No.2.30
Spherical aberration (mm)
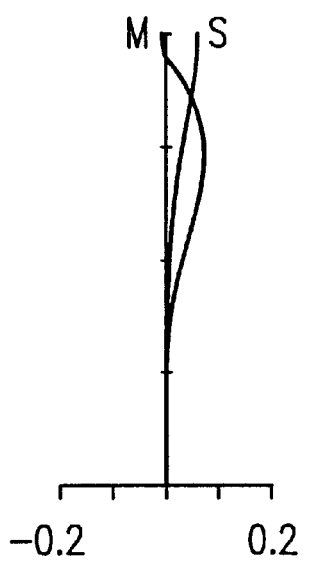
ω=5°
Astigmatism (mm)
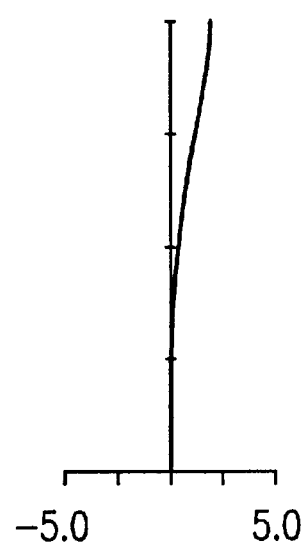
ω=5°
Distortion (%)
............ C line
———— d line
— — — F line

FIG. 8
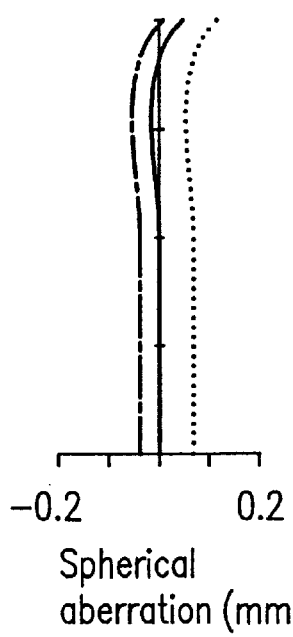
F/No.2.69
Spherical aberration (mm)
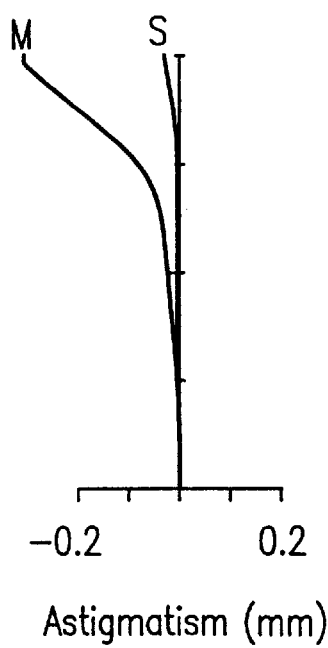
ω=2.9°
Astigmatism (mm)
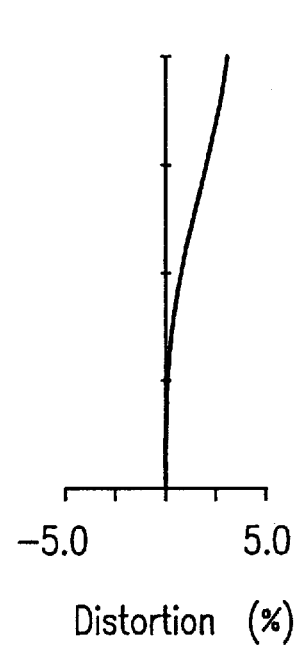
ω=2.9°
Distortion (%)
.............. C line
——— d line
—·—·— F line

ZOOM LENS AND IMAGING DEVICE INCORPORATING THE SAME

BACKGROUND OF THE INVENTION

1. Field of the Invention

The present invention relates to a small-sized zoom lens which provides high variable power for use in imaging devices (e.g., video cameras or digital still cameras); and an imaging device incorporating such a zoom lens.

2. Description of the Related Art

Small-sized and high-variable-power zoom lenses for use in an imaging device (e.g., a video camera or a digital still camera) are plagued with five modes of aberration, i.e., spherical aberration, coma, astigmatism, field curvature, and distortion, as well as chromatic aberration. Conventionally, various methods have been adopted to compensate for such aberrations.

In recent years, there has been an increasing desire to miniaturize various image processing devices. This has led to a need to shorten the lens length of such zoom lenses.

Such miniaturization requires not only compensation for the aforementioned five modes of aberration and chromatic aberration, but also a configuration in which incident light on the image plane becomes parallel to the optical axis of the system as much as possible (that is, the image side of the lens needs to be "telecentric"). This has presented a major design constraint to those who wish to construct a zoom lens with a short lens length.

Now, the structure of a conventional zoom lens will be described in detail.

For example, Japanese Laid-Open Publication No. 5-297275 discloses a zoom lens of a four-array rear focus type (hereinafter referred to as "Conventional Example 1"), as shown in FIG. 13. This zoom lens includes: a first lens array 101 which has positive refractive power and which is in a fixed position relative to an image plane 106; a second lens array 102 which has negative refractive power and which provides variable power by moving along the optical axis direction; a third lens array 103 which has positive refractive power and which is in a fixed position relative to the image plane 106; and a fourth lens array 104 which has positive refractive power and which is capable of moving along the optical axis direction so as to maintain the image plane 106, which moves corresponding to the movement of the second lens array 102 and the object to be imaged (hereinafter referred to as an "imaging object"), at a predetermined distance from a reference plane. The lens arrays 101 to 104 are arranged in the above order so that the first lens array 101 lies adjacent to the object to be imaged. Reference numeral 105 denotes a flat plate which is equivalent to a low-pass filter, an infrared cut filter, and/or a cover glass of an imaging device.

In accordance with the structure of Comparative Example 1, the first lens array 101, which is fixed relative to the image plane 106, provides an image formation function. The second lens array 102, which is capable of moving along the optical axis direction, provides a variable power function, i.e., ability to vary the focal length of the entire system. The third lens array 103, which is fixed relative to the image plane 106, provides a converging function. The fourth lens array 104, which is capable of moving along the optical axis direction, provides a focusing function, i.e., the ability to minimize the variation in the image-forming position responsive to any movement of the second lens array 102 and any movement of the object to be imaged.

However, with the structure of Comparative Example 1, it has been very difficult to realize a high-variable-power zoom lens of a sufficiently small size.

On the other hand, Japanese Laid-Open Publication No. 9-269452 describes a zoom lens (hereinafter referred to as "Conventional Example 2") which additionally includes a fifth lens array having negative refractive power in a four-array rear focus type zoom lens similar to that of Conventional Example 1, in an attempt to shorten the lens length of the zoom lens.

However, the zoom lenses of Comparative Examples 1 and 2 each have a problem in that, in order to achieve a high zooming ratio on the order of ×10 with such zoom lenses, the exit pupil will inevitably be located near the image plane. As a result, it is difficult to achieve telecentricity on the image side. These zoom lenses also have a problem in that their lens length cannot be sufficiently shortened, which makes it difficult to miniaturize such zoom lenses.

SUMMARY OF THE INVENTION

A zoom lens according to the present invention includes: a first lens array which has positive refractive power and which is in a fixed position relative to an image plane; a second lens array which has negative refractive power and which provides variable power by moving along an optical axis direction; a third lens array which has positive refractive power and which is in a fixed position relative to the image plane; a fourth lens array which has positive refractive power and which is capable of moving along the optical axis direction so as to maintain the image plane, which moves corresponding to movement of the second lens array and an object to be imaged, at a predetermined distance from a reference plane; a fifth lens array which has negative refractive power and which is in a fixed position relative to the image plane; and a sixth lens array which has positive refractive power and which is in a fixed position relative to the image plane, wherein the first to sixth lens arrays are arranged in a first through sixth order, respectively, so that the first lens array lies adjacent to the object to be imaged.

In one embodiment of the invention, the fifth lens array includes a single lens having negative refractive power, and the sixth lens array includes a single lens having positive refractive power.

In another embodiment of the invention, a wavelength selection filter is provided between the fifth lens array and the sixth lens array.

In still another embodiment of the invention, a focal length $f_5$ of the fifth lens array and a focal length $f_6$ of the sixth lens array satisfy the following relationship:

$$-3.0 < f_6/f_5 < -1.0 \qquad (1)$$

In still another embodiment of the invention, a displacement $D_z$ of the second lens array for effecting power variation from a wide angle mode to a telescopic mode and a focal length $f_W$ of the second lens array in the wide angle mode satisfy the following relationship:

$$1.0 < D_z/f_W < 2.2 \qquad (2)$$

In still another embodiment of the invention, a distance $T_O$ from a first lens surface to a proximal axis image plane on an imaging object side and a focal length $f_T$ of the zoom lens in the telescopic mode satisfy the following relationship:

$$0.7 < T_O/f_T < 0.9 \qquad (3)$$

In still another embodiment of the invention, each of the third lens array, the fourth lens array, and the sixth lens array includes at least one aspheric surface.

In still another embodiment of the invention, the third lens array has a two-lens structure including a biconvex lens having positive refractive power and a lens having negative refractive power.

In another aspect of the embodiment of the invention, there is provided an imaging device incorporating any of the aforementioned zoom lenses.

In accordance with the above constitution, a telescopic or so-called telephoto type zoom lens can be constructed by combining the negative refractive power of the fifth lens array with the total positive refractive power provided by the first to fourth lens arrays. As a result, the lens length of the zoom lens can be effectively shortened. As will be appreciated, the "total positive refractive power provided by the first to fourth lens arrays" means an inverse of the focal length (having a positive value) of the total optical system spanning from the first to fourth lens arrays.

The addition of the sixth lens array having positive refractive power makes it possible to realize a telecentric zoom lens (i.e., the exit pupil can be located away from the image plane). This is accounted for by the function of the fifth lens array of increasing the focal length of the entire system and the function of the sixth lens array of causing any rays which would otherwise enter the image plane at a relatively large incident angle to enter approximately in parallel relation to the optical axis.

In particular, by arranging the zoom lens so that a focal length $f_5$ of the fifth lens array and a focal length $f_6$ of the sixth lens array satisfy the relationship $-3.0<f_6/f_5<-1.0$, it becomes possible to achieve telecentricity on the image side, that is, the exit pupil can be located sufficiently away from the image plane (since $f_6/f_5<-1.0$). On the other hand, since $-3.0<f_6/f_5$, it is possible to prevent the lens length from becoming excessively large relative to the focal length.

By arranging the zoom lens so that a displacement $D_z$ of the second lens array for effecting power variation from a wide angle mode to a telescopic mode and a focal length $f_W$ of the second lens array in the wide angle mode satisfy the relationship $1.0<D_z/f_W<2.2$, the second lens array is not required to move a great distance for effecting desired power variation (since $D_z/f_W<2.2$), thereby making it possible to sufficiently shorten the lens length. On the other hand, since $1.0<D_z/f_W$, the negative refractive power of the second lens array becomes small enough so that the Petzval sum does not take an excessively large negative value. As a result, adequate compensation can be made for field curvature.

By arranging the zoom lens so that a distance $T_O$ from a first lens surface S1 to a proximal axis image plane on an imaging object side and a focal length $f_T$ of the zoom lens in the telescopic mode satisfy the relationship $0.7<T_O/f_T<0.9$, it becomes possible to shorten the lens length (since $T_O/f_T<0.9$). On the other hand, since $0.7<T_O/f_T$, the Petzval sum does not take an excessively large negative value. As a result, it is possible to compensate for field curvature.

According to an embodiment of the invention where the third lens array, the fourth lens array, and the sixth lens array each include at least one aspheric surface, it is possible to improve the spherical aberration over a range of modes including the wide angle mode to the telescopic mode (because of the third lens array including at least one aspheric surface). Moreover, it is possible to minimize the variation in aberration due to any movement of an object (because of the fourth lens array including at least one aspheric surface). Furthermore, it is possible to compensate for the aberration including any distortion at the periphery of the image plane (because of the sixth lens array including at least one aspheric surface).

By arranging the zoom lens so that a wavelength selection filter is provided between the fifth lens array and the sixth lens array (which are each in a fixed position relative to the image plane), it becomes possible to effectively utilize the interspaces between lenses, thereby making it possible to further shorten the lens length.

By arranging the zoom lens so that the fifth lens array consists essentially of a single lens having negative refractive power, and the sixth lens array consists essentially of a single lens having positive refractive power, the number of lenses in each lens array can be minimized, thereby making it possible to further reduce the mass, size, and production cost of the zoom lens.

By arranging the zoom lens so that the third lens array has a two-lens structure consisting of a biconvex lens having positive refractive power and a lens having negative refractive power, further improved optical characteristics can be provided with respect to aberration compensation.

Thus, the invention described herein makes possible the advantages of (1) providing a high-variable-power telecentric zoom lens which allows for miniaturization of the entire optical system while maintaining an exit pupil at a sufficient distance from an image plane, and which is capable of adequately compensating for various aberrations; and (2) providing an imaging device incorporating such a zoom lens.

These and other advantages of the present invention will become apparent to those skilled in the art upon reading and understanding the following detailed description with reference to the accompanying figures.

BRIEF DESCRIPTION OF THE DRAWINGS

FIG. 2 is an aberration diagram of a zoom lens according to Example 1 of the present invention in a position corresponding to a wide angle mode.

FIG. 3 is an aberration diagram of a zoom lens according to Example 1 of the present invention in a standard position.

FIG. 6 is an aberration diagram of a zoom lens according to Example 2 of the present invention in a position corresponding to a wide angle mode.

FIG. 7 is an aberration diagram of a zoom lens according to Example 2 of the present invention in a standard position.

FIG. 8 is an aberration diagram of a zoom lens according to Example 2 of the present invention in a position corresponding to a telescopic mode.

DESCRIPTION OF THE PREFERRED EMBODIMENTS

Hereinafter, the present invention will be described by way of examples, with reference to the accompanying figures.

EXAMPLE 1

Figure 1:
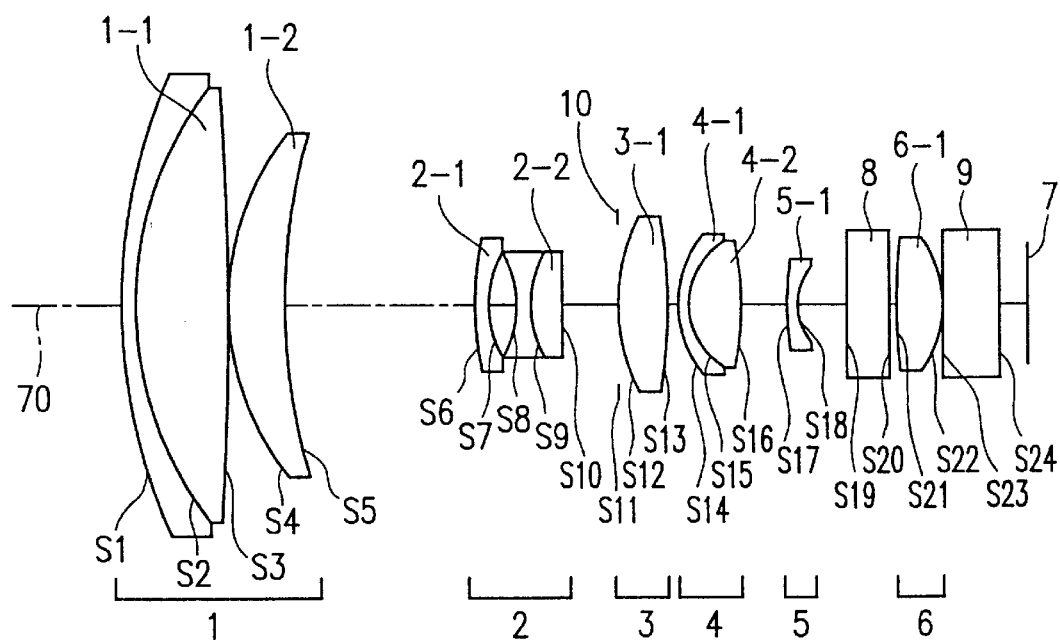
FIG. 1 is a cross-sectional view illustrating the structure of a zoom lens according to Example 1 of the present invention.

FIG. 1 illustrates the structure of a zoom lens according to Example 1 of the present invention.

With reference to FIG. 1, the zoom lens according to the present example includes: a first lens array 1 which has positive refractive power and which is in a fixed position relative to an image plane 7; a second lens array 2 which has negative refractive power and which provides variable power by moving along an optical axis direction 70; a third lens array 3 which has positive refractive power and which is in a fixed position relative to the image plane 7; a fourth lens array 4 which has positive refractive power and which is capable of moving along the optical axis direction 70 so as to maintain the image plane 7, which moves corresponding to the movement of the second lens array 2 and an object to be imaged, at a predetermined distance from a reference plane, a fifth lens array 5 which has negative refractive power and which is in a fixed position relative to the image plane 7; and a sixth lens array 6 which has positive refractive power and which is in a fixed position relative to the image plane 7. The first to sixth lens arrays 1 to 6 are arranged in this order so that the first lens array lies adjacent to the object to be imaged. The zoom lens further includes a flat plate 9 which is equivalent to a crystal low-pass filter or a cover glass of an imaging device; the image plane 7, a flat plate 8 which is equivalent to a wavelength selection filter (e.g., an infrared cut filter) provided between the fifth lens array 5 and the sixth lens array 6; and a diaphragm 10 for controlling the aperture of the zoom lens.

In the present specification, "positive refractive power" is defined as an inverse of a focal length having a positive value, whereas "negative refractive power" is defined as as an inverse of a focal length having a negative value.

The first lens array 1 consists essentially of a cemented lens 1-1 and a meniscus lens 1-2 having positive refractive power. The second lens array 2 consists essentially of a meniscus lens 2-1 having negative refractive power and a cemented lens 2-2. The third lens array 3 consists essentially of a biconvex lens 3-1 having positive refractive power. The fourth lens array 4 is a cemented lens consisting essentially of a concave lens 4-1 and a convex lens 4-2. The fifth lens array 5 consists essentially of a meniscus lens 5-1 having negative refractive power. The sixth lens array 6 consists essentially of a biconvex lens 6-1 having positive refractive power.

The zoom lens according to the present example includes five aspheric surfaces: sixth and seventh surfaces S6 and S7 (which are part of the second lens array 2); a twelfth surface S12 (which is part of the third lens array 3); a sixteenth surface S16 (which is part of the fourth lens array 4); and a twenty-second surface S22 (which is part of the sixth lens array 6).

Thus, the fifth lens array 5 consists essentially of a single lens (5-1) having negative refractive power and the sixth lens array 6 consists essentially of a single lens (6-1) having positive refractive power. As a result, the number of lenses in each lens array is minimized, thereby making it possible to further reduce the mass, size, and production cost of the zoom lens.

The focal length $f_5$ of the fifth lens array 5 and the focal length $f_6$ of the sixth lens array 6 satisfy the following relationship:

$$-3.0 < f_6/f_5 < -1.0 \qquad \text{eq. (1)}$$

The fifth lens array 5 provides such characteristics as to increase the focal length of the entire system. The sixth lens array 6 provides such characteristics as to cause any rays which would otherwise enter the image plane 7 at a relatively large incident angle to enter approximately in parallel relation to the optical axis 70. By utilizing such characteristics of the fifth and sixth lens arrays 5 and 6, the zoom lens according to the present example achieves telecentricity on the image side, that is, the exit pupil is located away from the image plane. If $f_6/f_5$ exceeds about −1.0, the exit pupil will be located too close to the image plane to achieve telecentricity on the image side. If $f_6/f_5$ is below about −3.0, the lens length will be too long relative to the focal length.

A displacement $D_z$ of the second lens array 2 required for effecting power variation from a wide angle mode to a telescopic mode and the focal length $f_W$ of the second lens array 2 in the wide angle mode satisfy the following relationship:

$$1.0 < D_z/f_W < 2.2 \qquad \text{eq. (2)}$$

If $D_z/f_W$ exceeds about 2.2, the lens length cannot be sufficiently shortened because the movement of the second lens array 2 corresponding to power variation would become too large. On the other hand, if $D_z/f_W$ is below about 1.0, the second lens array 2 will exhibit large negative refractive power, so that the Petzval sum will take an excessively large negative value. As a result, it will become difficult to compensate for field curvature.

As used in the present specification, a "lens length" (also referred to as the "optical overall length") is defined as the distance from a first lens surface S1 to an image plane of an optical system. The lens length of an optical system is correlated with the focal length, the effective image plane size, and the zoom ratio of the optical system. The zoom ratio is defined as a ratio of the focal length in the telescopic mode to the focal length in the wide-angle mode.

Furthermore, in accordance with the zoom lens of the present example, the distance $T_O$ from a first lens surface to a proximal axis image plane on an imaging object side (i.e., the lens length) and the focal length $f_T$ of the zoom lens in the telescopic mode satisfy the following relationship:

$$0.7 < T_O/f_T < 0.9 \qquad \text{eq. (3)}$$

If $T_O/f_T$ exceeds about 0.9, the lens length cannot be sufficiently shortened. If $T_O/f_T$ is below about 0.7, the Petzval sum will take an excessively large negative value, thereby making it difficult to compensate for field curvature.

Each of the third lens array 3, the fourth lens array 4, and the sixth lens array 6 includes at least one aspheric surface. Because of the third lens array 3 including at least one aspheric surface, it is possible to improve the spherical aberration from the wide angle mode to the telescopic mode. Because of the fourth lens array 4 including at least one aspheric surface, it is possible to minimize the variation in aberration due to any movement of an object. Because of the sixth lens array 6 including at least one aspheric surface, it is possible to compensate for the aberration including any distortion at the periphery of the image plane.

Furthermore, according to the present invention, a wavelength selection filter 8 (e.g., an infrared cut filter) is interposed between the fifth lens array 5 and the sixth lens array 6. In contrast, a conventional zoom lens would typically incorporate an infrared cut filter in a back focus section. As a result, the present invention makes it possible to effectively utilize the interspaces between lenses, so that the lens length can be further shortened.

Exemplary values representing the configuration and the characteristics of the respective elements of the zoom lens according to the present example are shown in Tables 1 to 3 below.

TABLE 1

| Array # | Surface # | r | d | n | v |
|---|---|---|---|---|---|
| 1 | S1 | 22.342 | 0.50 | 1.92288 | 20.9 |
|  | S2 | 13.784 | 3.84 | 1.69100 | 54.7 |
|  | S3 | −161.103 | 0.10 |  |  |
|  | S4 | 12.719 | 2.29 | 1.62280 | 56.9 |
|  | S5 | 31.460 | Variable |  |  |
| 2 | S6 | 48.735 | 0.50 | 1.81474 | 37.0 |
|  | S7 | 6.382 | 1.08 |  |  |
|  | S8 | −5.100 | 0.50 | 1.88300 | 40.8 |
|  | S9 | 4.097 | 1.27 | 1.92286 | 20.9 |
|  | S10 | 39.415 | Variable |  |  |
| Diaphragm | S11 | INFINITY | 0.10 |  |  |
| 3 | S12 | 6.498 | 2.14 | 1.58913 | 61.3 |
|  | S13 | −17.508 | Variable |  |  |
| 4 | S14 | 5.101 | 0.50 | 1.84666 | 23.8 |
|  | S15 | 3.222 | 2.20 | 1.58313 | 59.5 |
|  | S16 | −12.478 | Variable |  |  |
| 5 | S17 | 9.929 | 0.50 | 1.80610 | 33.3 |
|  | S18 | 2.506 | 2.14 |  |  |
| Infrared | S19 | INFINITY | 1.60 | 1.51680 | 64.2 |
| cut filter | S20 | INFINITY | 0.38 |  |  |
| 6 | S21 | 18.963 | 1.85 | 1.60578 | 44.0 |
|  | S22 | −6.142 | 0.10 |  |  |
| Low-pass filter | S23 | INFINITY | 2.25 | 1.51680 | 64.2 |
| cover glass | S24 | INFINITY |  |  |  |

TABLE 2

| f | 4.5 mm | 26.0 mm | 45.0 mm |
|---|---|---|---|
| F/No | 1.83 | 2.33 | 2.81 |
| 2ω | 54.0° | 10.0° | 5.8° |
| 5 | 0.39 | 7.53 | 9.18 |
| 10 | 9.18 | 2.04 | 0.39 |
| 13 | 1.84 | 0.47 | 1.76 |
| 16 | 0.60 | 1.97 | 0.67 |

TABLE 3

| Surface | S6 | S7 | S12 | S16 | S22 |
|---|---|---|---|---|---|
| k | 0 | 0 | 0 | 0 | 0 |
| a | 4.88E-03 | 5.41E-03 | −1.02445E-03 | 2.13727E-03 | −2.27068E-03 |
| b | −5.35E-04 | −3.79E-04 | −3.02335E-06 | −1.05519E-04 | 2.86986E-04 |
| c | 5.45E-05 | 1.04E-05 | −9.48623E-08 | −1.20839E-06 | −4.40551E-05 |
| d | −1.55E-06 | 7.62E-06 | −1.90932E-09 | 1.81422E-07 | 2.24236E-06 |

In Table 1, r denotes the radius of curvature of each lens surface; d denotes lens thickness or the length of the interspaces (air) between lenses; n denotes a refractive index of each lens with respect to the d line; and v denotes the Abbe constant of each lens with respect to the d line.

Table 2 illustrates the relationship between the distance between two variable surfaces with respect to an infinity point, a focal length (f), an F number (F/No), and an incident half-angle of view (ω).

Table 3 shows the respective conical constant (k) and the respective aspheric constants (a, b, c, and d) of the sixth and seventh surfaces S6 and S7 (which are part of the second lens array 2); the twelfth surface S12 (which is part of the third lens array 3); the sixteenth surface S16 (which is part of the fourth lens array 4); and the twenty-second surface S22 (which is part of the sixth lens array 6). The distance (Z) from an aspheric apex of an aspheric surface to a point on the aspheric surface that is at a height (y) with respect to the optical axis can be defined as follows:

$$Z=(1/r)y^2/\{1+(1-(1+k)(1/r)^2y^2)^{1/2}\}+ay^4+by^6+cy^8+dy^{10} \quad \text{eq. (4)}$$

In eq.(4), r denotes the radius of curvature at the aspheric apex.

Figure 4:
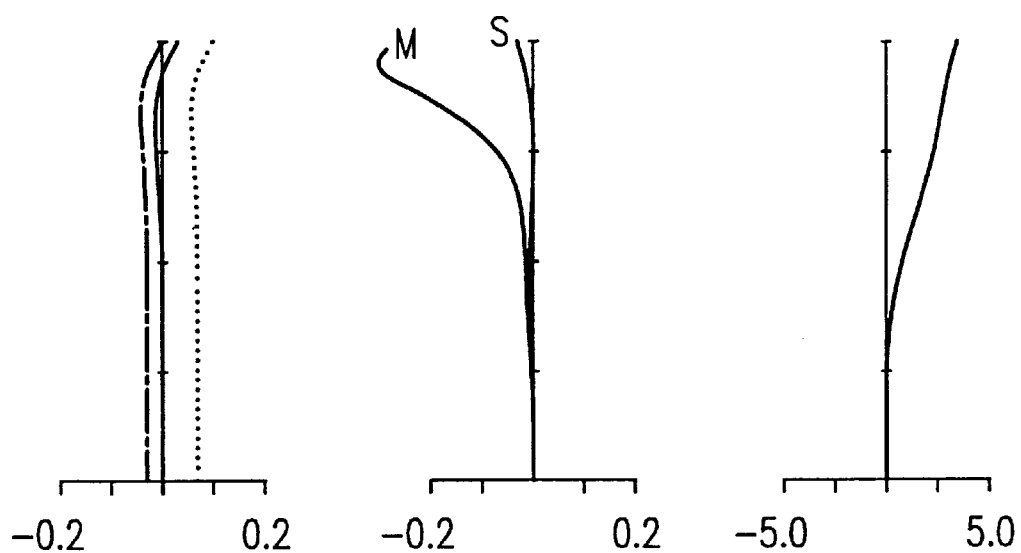
FIG. 4 is an aberration diagram of a zoom lens according to Example 1 of the present invention in a position corresponding to a telescopic mode.

In the present example, $f_5/f_6=-1.84$, $D_z/F_w=1.95$, and $T_O/F_T=0.82$, zoom ratio (i.e., the ratio of the telescopic mode focal length 45 mm to the wide-angle mode focal length 4.5 mm)=10, and lens length=37 mm. Thus, the zoom lens of the present example exhibited excellent optical characteristics concerning spherical aberration, astigmatism, and distortion in a position corresponding to the wide angle mode (FIG. 2), a standard position (FIG. 3), and a position corresponding to the telescopic mode (FIG. 4).

In FIG. 2, the "C line", "d line", and "F line" represent Fraunhofer lines in the sunlight spectrum. In general photographic lens designing, three to four wavelengths are selected from among the C line, d line, e line, F line, and g line. The "C line" corresponds to a wavelength of 656.28 nm: the "d line" corresponds to a wavelength of 587.56 nm; and the "F line" corresponds to a wavelength of 486.13 nm.

For comparison, according to Japanese Laid-Open Publication No. 5-297275, the lens length is about 50.0 mm for a range of focal lengths from 4.3 to 42.9 mm (zoom ratio: 10); assuming a telescopic focal length of 45 mm, this lens length converts to about 52.4 mm, so that $T_O/F_T=52.4/45=1.17$. On the other hand, according to Japanese Laid-Open Publication No. 9-269452, the lens length is about 10.0 mm for a range of focal lengths from 1.0 to 10 mm (zoom ratio: 10); assuming a telescopic focal length of 45 mm, this lens length converts to about 45 mm, so that $T_O/F_T=45/45=1.0$.

Although the fifth lens array 5 consists essentially of a single lens (5-1) having negative refractive power according to the present example, the fifth lens array 5 may consist of multiple lenses without undermining the effects of the invention. Similarly, the sixth lens array 6 may consist of multiple lenses.

EXAMPLE 2

Figure 5:
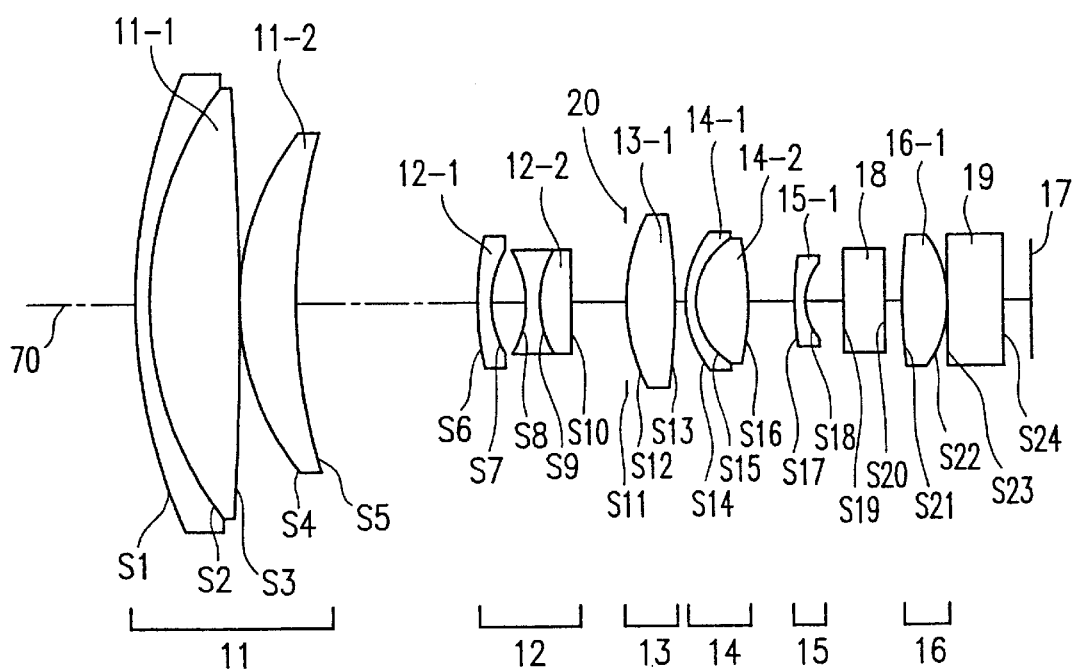
FIG. 5 is a cross-sectional view illustrating the structure of a zoom lens according to Example 2 of the present invention.

FIG. 5 illustrates the structure of a zoom lens according to Example 2 of the present invention.

With reference to FIG. 5, the zoom lens according to the present example includes: a first lens array 11 which has positive refractive power and which is in a fixed position relative to an image plane 17; a second lens array 12 which has negative refractive power and which provides variable power by moving along an optical axis direction 70; a third lens array 13 which has positive refractive power and which is in a fixed position relative to the image plane 17; a fourth lens array 14 which has positive refractive power and which is capable of moving along the optical axis direction 70 so as to maintain the image plane 17, which moves corresponding to the movement of the second lens array 12 and an object to be imaged, at a predetermined distance from a reference plane; a fifth lens array 15 which has negative refractive power and which is in a fixed position relative to the image plane 17; and a sixth lens array 16 which has positive refractive power and which is in a fixed position relative to the image plane 17. The first to sixth lens arrays 11 to 16 are arranged in this order so that the first lens array lies adjacent to the object to be imaged. The zoom lens further includes a flat plate 19 which is equivalent to a crystal low-pass filter or a cover glass of an imaging device; the image plane 17, a flat plate 18 which is equivalent to a wavelength selection filter (e.g., an infrared cut filter) provided between the fifth lens array 15 and the sixth lens array 16; and a diaphragm 20 for controlling the aperture of the zoom lens.

The first lens array 11 consists essentially of a cemented lens 11-1 and a meniscus lens 11-2 having positive refractive power. The second lens array 12 consists essentially of a meniscus lens 12-1 having negative refractive power and a cemented lens 12-2. The third lens array 13 consists essentially of a biconvex lens 13-1 having positive refractive power. The fourth lens array 14 is a cemented lens consisting essentially of a concave lens 14-1 and a convex lens 14-2. The fifth lens array 15 consists essentially of a meniscus lens 15-1 having negative refractive power. The sixth lens array 16 consists essentially of a biconvex lens 16-1 having positive refractive power.

The zoom lens according to the present example includes four aspheric surfaces: twelfth and thirteenth surfaces S12 and S13 (which are part of the third lens array 13); a sixteenth surface S16 (which is part of the fourth lens array 14); and a twenty-second surface S22 (which is part of the sixth lens array 16).

The first lens array 11, the second lens array 12, the third lens array 13, the fourth lens array 14, the fifth lens array 15, and the sixth lens array 16 according to Example 2 correspond to, respectively, the first lens array 1, the second lens array 2, the third lens array 3, the fourth lens array 4, the fifth lens array 5, and the sixth lens array 6 according to Example 1. Since the respective elements in Example 2 have similar characteristics to those of their corresponding elements in Example 1, the description of such similar elements is omitted.

Next, exemplary values representing the configuration and the characteristics of the respective elements of the zoom lens according to the present example are shown in Tables 4 to 6 below. Since Tables 4, 5, and 6 correspond to Tables 1, 2, and 3 described in Example 1, respectively, the detailed description thereof is omitted.

TABLE 4

| Array # | Surface # | r | d | n | ν |
|---|---|---|---|---|---|
| 1 | S1 | 22.072 | 0.50 | 1.92286 | 20.9 |
|   | S2 | 13.468 | 4.34 | 1.67790 | 50.6 |
|   | S3 | −77.514 | 0.10 |   |   |
|   | S4 | 11.061 | 2.20 | 1.56384 | 60.8 |
|   | S5 | 20.097 | Variable |   |   |
| 2 | S6 | 24.184 | 0.50 | 1.80610 | 33.3 |
|   | S7 | 4.829 | 1.20 |   |   |
|   | S8 | −6.403 | 0.50 | 1.88300 | 40.8 |

TABLE 4-continued

| Array # | Surface # | r | d | n | ν |
|---|---|---|---|---|---|
|   | S9 | 3.781 | 1.27 | 1.92286 | 20.9 |
|   | S10 | 29.963 | Variable |   |   |
| Diaphragm | S11 | INFINITY | 0.10 |   |   |
| 3 | S12 | 6.008 | 2.02 | 1.58913 | 61.3 |
|   | S13 | −32.795 | Variable |   |   |
| 4 | S14 | 4.058 | 0.50 | 1.84666 | 23.8 |
|   | S15 | 2.637 | 2.20 | 1.58313 | 59.5 |
|   | S16 | −12.367 | Variable |   |   |
| 5 | S17 | 39.150 | 0.50 | 1.88300 | 40.8 |
|   | S18 | 2.791 | 1.47 |   |   |
| Infrared cut filter | S19 | INFINITY | 1.60 | 1.51680 | 64.2 |
|   | S20 | INFINITY | 0.94 |   |   |
| 6 | S21 | 8.664 | 1.74 | 1.60578 | 44.0 |
|   | S22 | −8.313 | 0.10 |   |   |
| Low-pass filter cover glass | S23 | INFINITY | 2.25 | 1.51680 | 64.2 |
|   | S24 | INFINITY |   |   |   |

TABLE 5

| f | 4.5 mm | 26.0 mm | 45.0 mm |
|---|---|---|---|
| F/No | 1.83 | 2.30 | 2.69 |
| 2ω | 54.0° | 10.0° | 5.8° |
| 5 | 0.39 | 7.63 | 9.30 |
| 10 | 9.30 | 2.10 | 0.40 |
| 13 | 1.53 | 0.46 | 1.42 |
| 16 | 0.60 | 1.67 | 0.71 |

TABLE 6

| Surface | S12 | S13 | S16 | S22 |
|---|---|---|---|---|
| k | 0 | 0 | 0 | 0 |
| a | −7.49387E−04 | 3.12888E−04 | 3.61762E−03 | −1.97490E−03 |
| b | 1.12513E−04 | 9.40397E−05 | −3.72745E−04 | 3.30992E−04 |
| c | −1.32095E−05 | −1.34729E−01 | 6.41189E−05 | −5.38584E−01 |
| d | 4.67631E−01 | 5.48287E−01 | −5.78093E−06 | 3.11231E−01 |

In the present example, $f_5/f_6=-2.12$, $D_z/F_w=1.98$, and $T_O/F_T=0.82$. Thus, the zoom lens of the present example exhibited excellent optical characteristics concerning spherical aberration, astigmatism, and distortion in a position corresponding to the wide angle mode (FIG. 6), a standard position (FIG. 7), and a position corresponding to the telescopic mode (FIG. 8).

EXAMPLE 3

Figure 9:
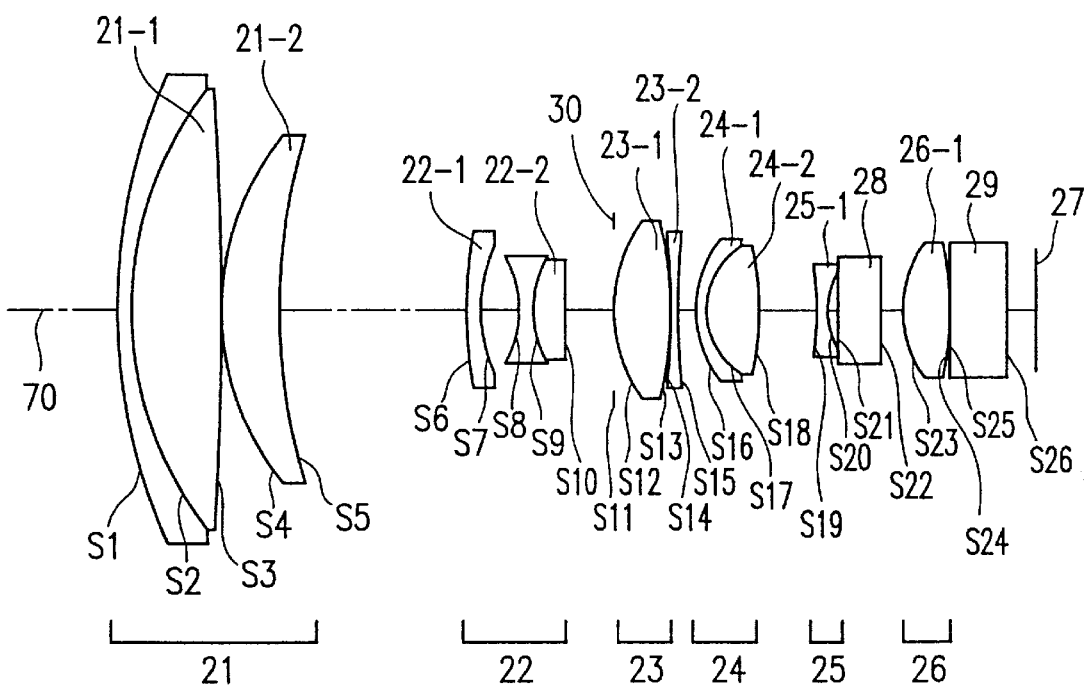
FIG. 9 is a cross-sectional view illustrating the structure of a zoom lens according to Example 3 of the present invention.

FIG. 9 illustrates the structure of a zoom lens according to Example 3 of the present invention.

With reference to FIG. 9, the zoom lens according to the present example includes: a first lens array 21 which has positive refractive power and which is in a fixed position relative to an image plane 27; a second lens array 22 which has negative refractive power and which provides variable power by moving along an optical axis direction 70; a third lens array 23 which has positive refractive power and which is in a fixed position relative to the image plane 27; a fourth lens array 24 which has positive refractive power and which is capable of moving along the optical axis direction 70 so as to maintain the image plane 27, which moves corresponding to any movement of the second lens array 22 and an object to be imaged, at a predetermined distance from a reference plane; a fifth lens array 25 which has negative refractive power and which is in a fixed position relative to the image plane 27; and a sixth lens array 26 which has positive refractive power and which is in a fixed position relative to the image plane 27. The first to sixth lens arrays 21 to 26 are arranged in this order so that the first lens array lies adjacent to the object to be imaged. The zoom lens further includes a flat plate 29 which is equivalent to a crystal low-pass filter or a cover glass of an imaging device; the image plane 27, a flat plate 28 which is equivalent to a wavelength selection filter (e.g., an infrared cut filter) provided between the fifth lens array 25 and the sixth lens array 26; and a diaphragm 30 for controlling the aperture of the zoom lens.

The first lens array 21 consists essentially of a cemented lens 21-1 and a meniscus lens 21-2 having positive refractive power. The second lens array 22 consists essentially of a meniscus lens 22-1 having negative refractive power and a cemented lens 22-2. The third lens array 23 consists essentially of a biconvex lens 23-1 having positive refractive power and a lens 23-2 having negative refractive power. The fourth lens array 24 is a cemented lens consisting essentially of a concave lens 24-1 and a convex lens 24-2. The fifth lens array 25 consists essentially of a biconcave lens 25-1 having negative refractive power. The sixth lens array 26 consists essentially of a biconvex lens 26-1 having positive refractive power.

The zoom lens according to the present example includes four aspheric surfaces: a sixth surface S6 (which is part of the second lens array 22); twelfth and fifteenth surfaces S12 and S15 (which is part of the third lens array 23); and an eighteenth surface S18 (which is part of the fourth lens array 24).

Since the third lens array 23 has a two-lens structure consisting essentially of a biconvex lens 23-1 having positive refractive power and a lens 23-2 having negative refractive power, further improved optical characteristics can be provided with respect to aberration compensation according to Example 3.

The first lens array 21, the second lens array 22, the third lens array 23, the fourth lens array 24, the fifth lens array 25, and the sixth lens array 26 according to Example 3 correspond to, respectively, the first lens array 1, the second lens array 2, the third lens array 3, the fourth lens array 4, the fifth lens array 5, and the sixth lens array 6 according to Example 1. Since the respective elements in Example 3 have similar characteristics to those of their corresponding elements in Example 1, the description of such similar elements is omitted.

Next, exemplary values representing the configuration and the characteristics of the respective elements of the zoom lens according to the present example are shown in Tables 7 to 9 below. Since Tables 7, 8, and 9 correspond to Tables 1, 2, and 3 described in Example 1, respectively, the detailed description thereof is omitted.

TABLE 7

| Array # | Surface # | r | d | n | ν |
|---|---|---|---|---|---|
| 1 | S1 | 23.926 | 0.50 | 1.84666 | 23.8 |
| | S2 | 12.577 | 4.00 | 1.75700 | 47.7 |
| | S3 | −334.526 | 0.10 | | |
| | S4 | 11.644 | 2.54 | 1.49700 | 81.6 |
| | S5 | 32.791 | Variable | | |
| 2 | S6 | 31.903 | 0.50 | 1.81474 | 37.0 |
| | S7 | 7.494 | 1.47 | | |

TABLE 7-continued

| Array # | Surface # | r | d | n | ν |
|---|---|---|---|---|---|
| | S8 | −5.462 | 0.50 | 1.88300 | 40.8 |
| | S9 | 3.558 | 1.27 | 1.92286 | 20.9 |
| | S10 | 13.040 | Variable | | |
| Diaphragm | S11 | INFINITY | 0.10 | | |
| 3 | S12 | 4.668 | 2.55 | 1.51680 | 64.2 |
| | S13 | −14.653 | 0.10 | | |
| | S14 | −35.174 | 0.50 | 1.82027 | 29.7 |
| | S15 | −57.035 | Variable | | |
| 4 | S16 | 4.325 | 0.50 | 1.69894 | 30.1 |
| | S17 | 2.466 | 1.70 | 1.58313 | 59.5 |
| | S18 | −61.377 | Variable | | |
| 5 | S19 | −14.240 | 0.50 | 1.80610 | 33.3 |
| | S20 | 3.772 | 0.48 | | |
| Infrared | S21 | INFINITY | 1.60 | 1.51680 | 64.2 |
| cut filter | S22 | INFINITY | 1.06 | | |
| 6 | S23 | 5.840 | 1.90 | 1.63980 | 34.6 |
| | S24 | −12.696 | 0.10 | | |
| Low-pass filter | S25 | INFINITY | 2.25 | 1.51680 | 64.2 |
| cover glass | S26 | INFINITY | | | |

TABLE 8

| f | 4.5 mm | 26.0 mm | 45.0 mm |
|---|---|---|---|
| F/No | 1.84 | 2.33 | 2.70 |
| 2ω | 54.0° | 10.0° | 5.8° |
| 5 | 0.39 | 7.12 | 8.65 |
| 10 | 8.67 | 1.94 | 0.41 |
| 15 | 1.96 | 0.47 | 1.89 |
| 18 | 0.59 | 2.08 | 0.66 |

TABLE 9

| Surface | S6 | S12 | S15 | S18 |
|---|---|---|---|---|
| k | 0 | 0 | 0 | 0 |
| a | 4.54268E−04 | −1.10746E−03 | 1.30730E−04 | 2.56301E−03 |
| b | 2.93899E−05 | 6.82738E−05 | 1.77048E−04 | −3.43509E−04 |
| c | −7.03576E−07 | −6.98061E−06 | −1.84182E−05 | 7.26583E−05 |
| d | 1.38848E−07 | 2.41862E−07 | 1.01094E−06 | −6.44093E−06 |

Figure 10:
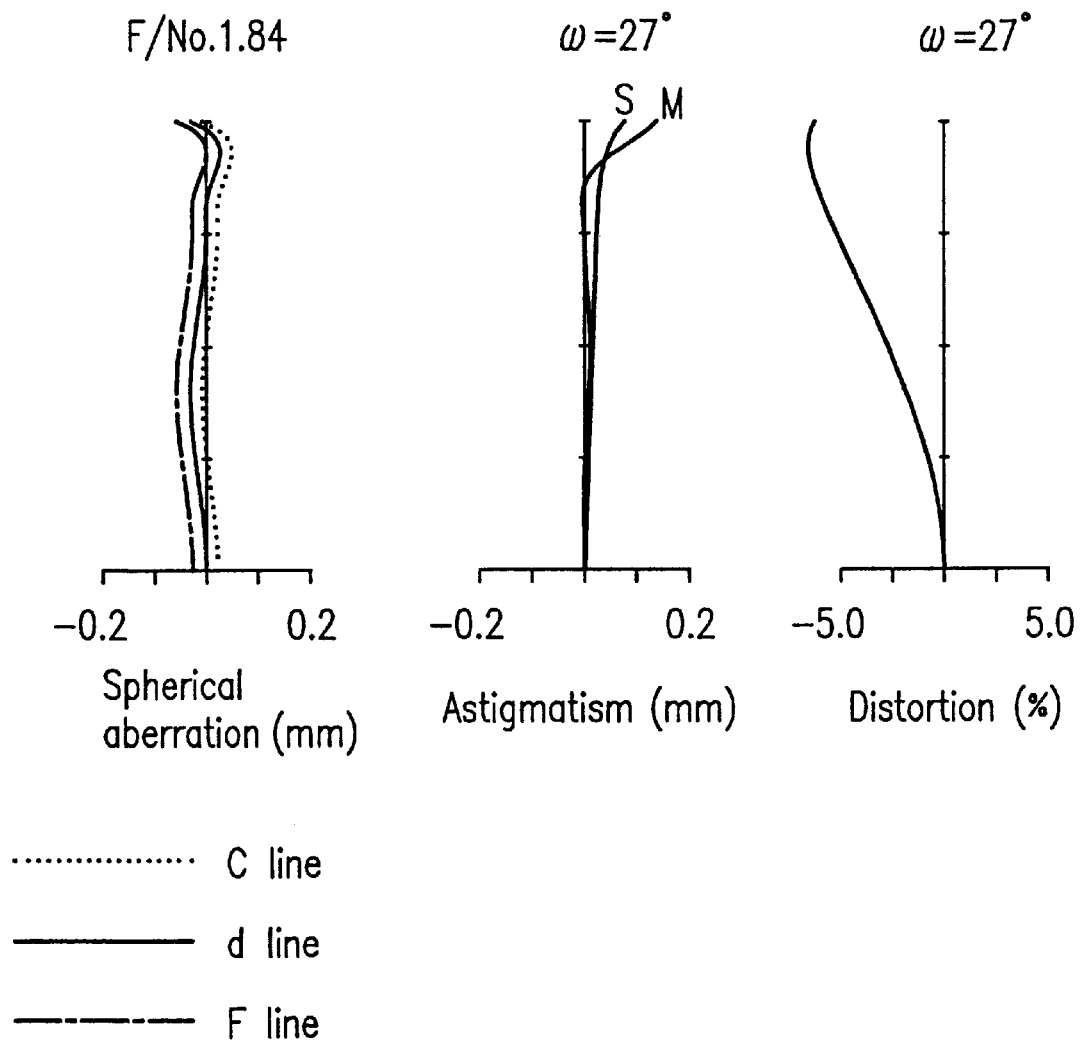
FIG. 10 is an aberration diagram of a zoom lens according to Example 3 of the present invention in a position corresponding to a wide angle mode.
Figure 11:
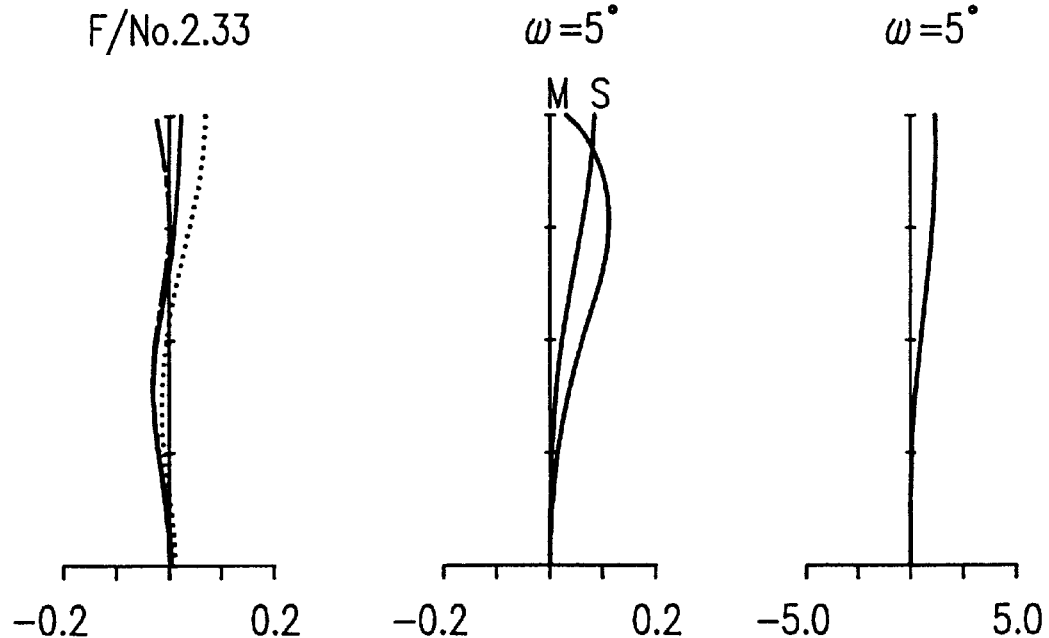
FIG. 11 is an aberration diagram of a zoom lens according to Example 3 of the present invention in a standard position.
Figure 12:
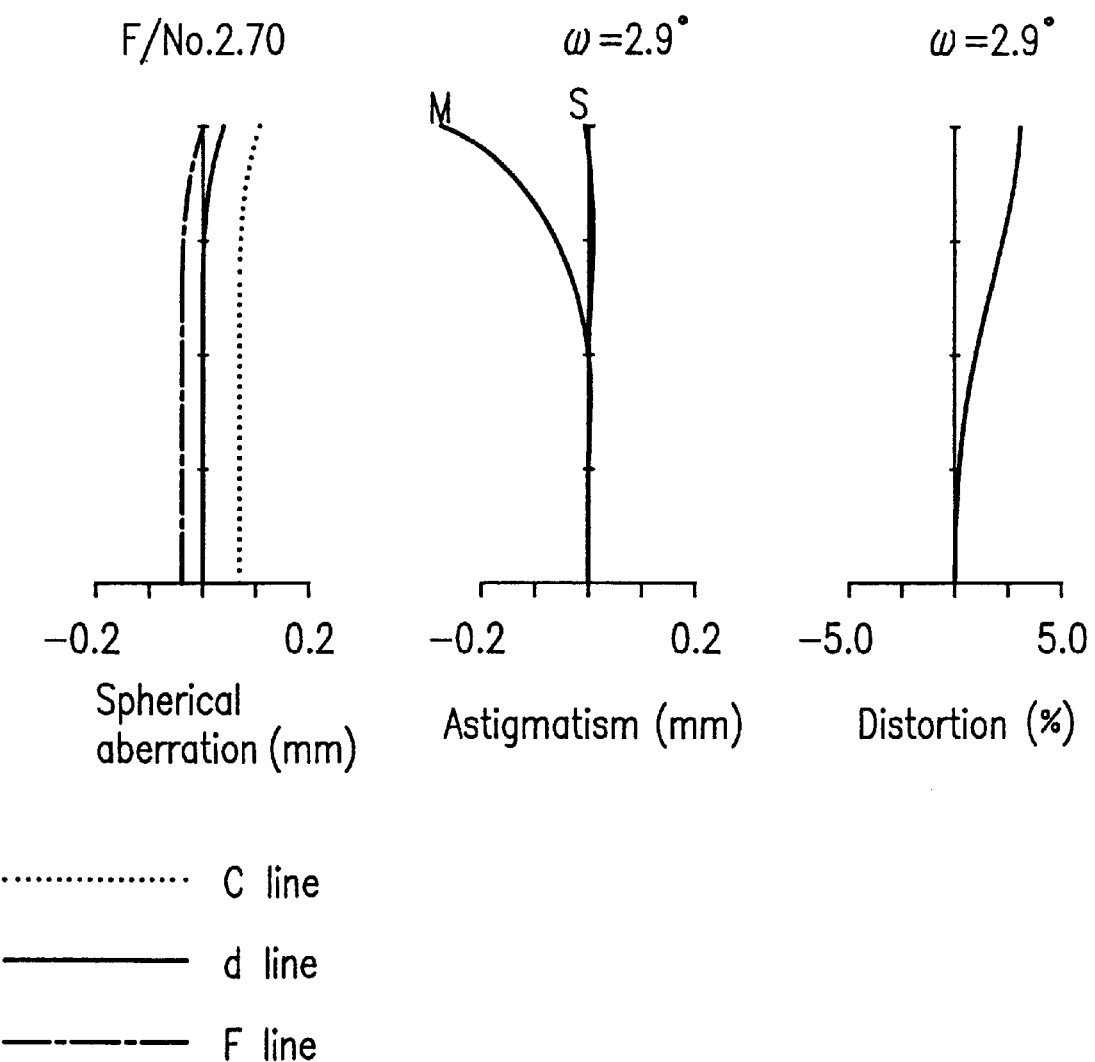
FIG. 12 is an aberration diagram of a zoom lens according to Example 3 of the present invention in a position corresponding to a telescopic mode.
Figure 13:
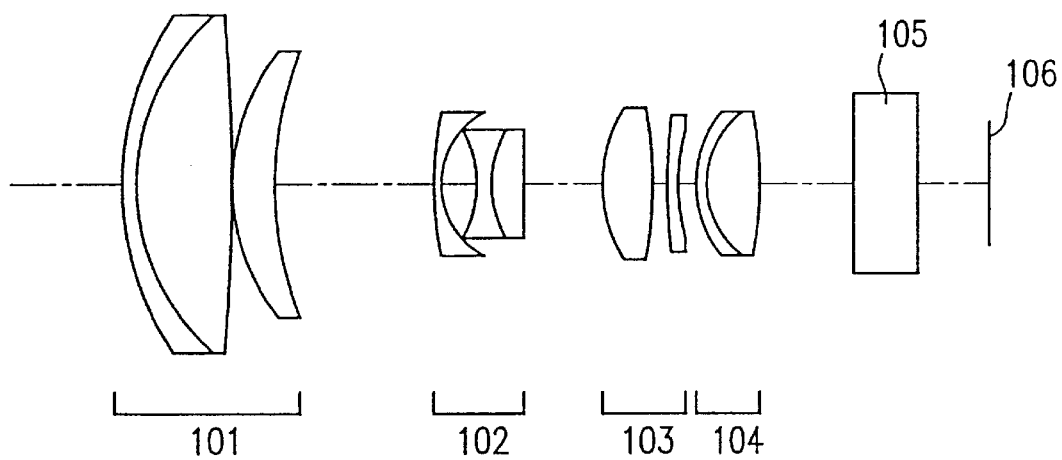
FIG. 13 is a cross-sectional view illustrating the structure of a conventional zoom lens.

In the present example, $f_5/f_6 = -1.81$, $D_z/F_w = 1.84$, and $T_O/F_T = 0.82$. Thus, the zoom lens of the present example exhibited excellent optical characteristics concerning spherical aberration, astigmatism, and distortion in a position corresponding to the wide angle mode (FIG. 10), a standard position (FIG. 11), and a position corresponding to the telescopic mode (FIG. 12).

As described above, the present invention provides a telescopic or so-called telephoto type zoom lens by combining the negative refractive power of the fifth lens array with the total positive refractive power provided by the first to fourth lens arrays. As a result, the lens length of the zoom lens can be effectively shortened.

The addition of the sixth lens array having positive refractive power makes it possible to realize a telecentric zoom lens (i.e., the exit pupil can be located away from the image plane). This is accounted for by the function of the fifth lens array of increasing the focal length of the entire system and the function of the sixth lens array of causing any rays which would otherwise enter the image plane at a relatively large incident angle to enter approximately in parallel relation to the optical axis.

Specifically, it is possible to provide a small-sized and high-variable-power zoom lens having a high zooming ratio on the order of ×10 and an F number of about 1.8 while maintaining telecentricity on the image side, for example.

In particular, by arranging the zoom lens so that a focal length $f_5$ of the fifth lens array and a focal length $f_6$ of the sixth lens array satisfy the relationship $-3.0 < f_6/f_5 < -1.0$, it becomes possible to achieve telecentricity on the image side, that is, the exit pupil can be located sufficiently away from the image plane (since $f_6/f_5 < -1.0$). On the other hand, since $-3.0 < f_6/f_5$, it is possible to prevent the lens length from becoming excessively large relative to the focal length.

By arranging the zoom lens so that a displacement $D_z$ of the second lens array for effecting power variation from a wide angle mode to a telescopic mode and a focal length $f_W$ of the second lens array in the wide angle mode satisfy the relationship $1.0 < D_z/f_W < 2.2$, the second lens array is not required to move a great distance for effecting desired power variation (since $D_z/f_W < 2.2$), thereby making it possible to sufficiently shorten the lens length. On the other hand, since $1.0 < D_z/f_W$, the negative refractive power of the second lens array becomes small enough so that the Petzval sum does not take an excessively large negative value. As a result, adequate compensation can be made for field curvature.

By arranging the zoom lens so that a distance $T_O$ from a first lens surface S1 to a proximal axis image plane on an imaging object side and a focal length $f_T$ of the zoom lens in the telescopic mode satisfy the relationship $0.7 < T_O/f_T < 0.9$, it becomes possible to shorten the lens length (since $T_O/f_T < 0.9$). On the other hand, since $0.7 < T_O/f_T$, the Petzval sum does not take an excessively large negative value. As a result, it is possible to compensate for field curvature.

According to an embodiment of the invention where the third lens array, the fourth lens array, and the sixth lens array each include at least one aspheric surface, it is possible to improve the spherical aberration over a range of modes including the wide angle mode to the telescopic mode (because of the third lens array including at least one aspheric surface). Moreover, it is possible to minimize the variation in aberration due to any movement of an object (because of the fourth lens array including at least one aspheric surface). Furthermore, it is possible to compensate for the aberration including any distortion at the periphery of the image plane (because of the sixth lens array including at least one aspheric surface).

By arranging the zoom lens so that a wavelength selection filter is provided between the fifth lens array and the sixth lens array (which are each in a fixed position relative to the image plane), it becomes possible to effectively utilize the interspaces between lenses, thereby making it possible to further shorten the lens length.

By arranging the zoom lens so that the fifth lens array consists essentially of a single lens having negative refractive power, and the sixth lens array consists essentially of a single lens having positive refractive power, the number of lenses in each lens array can be minimized, thereby making it possible to further reduce the mass, size, and production cost of the zoom lens.

By arranging the zoom lens so that the third lens array has a two-lens structure consisting of a biconvex lens having positive refractive power and a lens having negative refractive power, further improved optical characteristics can be provided with respect to aberration compensation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A zoom lens comprising:

a first lens array which has positive refractive power and which is in a fixed position relative to an image plane;

a second lens array which has negative refractive power and which provides variable power by moving along an optical axis direction;

a third lens array which has positive refractive power and which is in a fixed position relative to the image plane;

a fourth lens array which has positive refractive power and which is capable of moving along the optical axis direction so as to maintain the image plane, which moves corresponding to movement of the second lens array and an object to be imaged, at a predetermined distance from a reference plane;

a fifth lens array which has negative refractive power and which is in a fixed position relative to the image plane; and a sixth lens array which has positive refractive power and which is in a fixed position relative to the image plane, wherein the first to sixth lens arrays are arranged in a first through sixth order, respectively, so that the first lens array lies adjacent to the object to be imaged.

2. A zoom lens according to claim 1, wherein the fifth lens array comprises a single lens having negative refractive power, and the sixth lens array comprises a single lens having positive refractive power.

3. A zoom lens according to claim 1, wherein a wavelength selection filter is provided between the fifth lens array and the sixth lens array.

4. A zoom lens according to claim 1, wherein a focal length $f_5$ of the fifth lens array and a focal length $f_6$ of the sixth lens array satisfy the following relationship:

$$-3.0 < f_6/f_5 < -1.0 \qquad (1)$$

5. A zoom lens according to claim 1, wherein a displacement $D_z$ of the second lens array for effecting power variation from a wide angle mode to a telescopic mode and a focal length $f_W$ of the second lens array in the wide angle mode satisfy the following relationship:

$$1.0 < D_z/f_W < 2.2 \qquad (2)$$

6. A zoom lens according to claim 1, wherein a distance $T_O$ from a first lens surface to a proximal axis image plane on an imaging object side and a focal length $f_T$ of the zoom lens in the telescopic mode satisfy the following relationship:

$$0.7 < T_O/f_T < 0.9 \qquad (3)$$

7. A zoom lens according to claim 1, wherein each of the third lens array, the fourth lens array, and the sixth lens array includes at least one aspheric surface.

8. A zoom lens according to claim 1, wherein the third lens array has a two-lens structure comprising a biconvex lens having positive refractive power and a lens having negative refractive power.

9. An imaging device incorporating the zoom lens according to claim 1.

10. A zoom lens according to claim 1, wherein at least one aspheric surface is included in the second, third and fourth lens arrays.

11. A zoom lens according to claim 1, wherein each of the second lens array, the third lens array, and the fourth lens array includes at least one aspheric surface.

12. A zoom lens according to claim 1, wherein each of the second lens array, the third lens array, the fourth lens array, and the sixth lens array includes at least one aspheric surface.

13. A zoom lens according to claim 1 wherein the third lens array comprises a biconvex lens having positive refractive power.

* * * * *